UNITED STATES PATENT OFFICE.

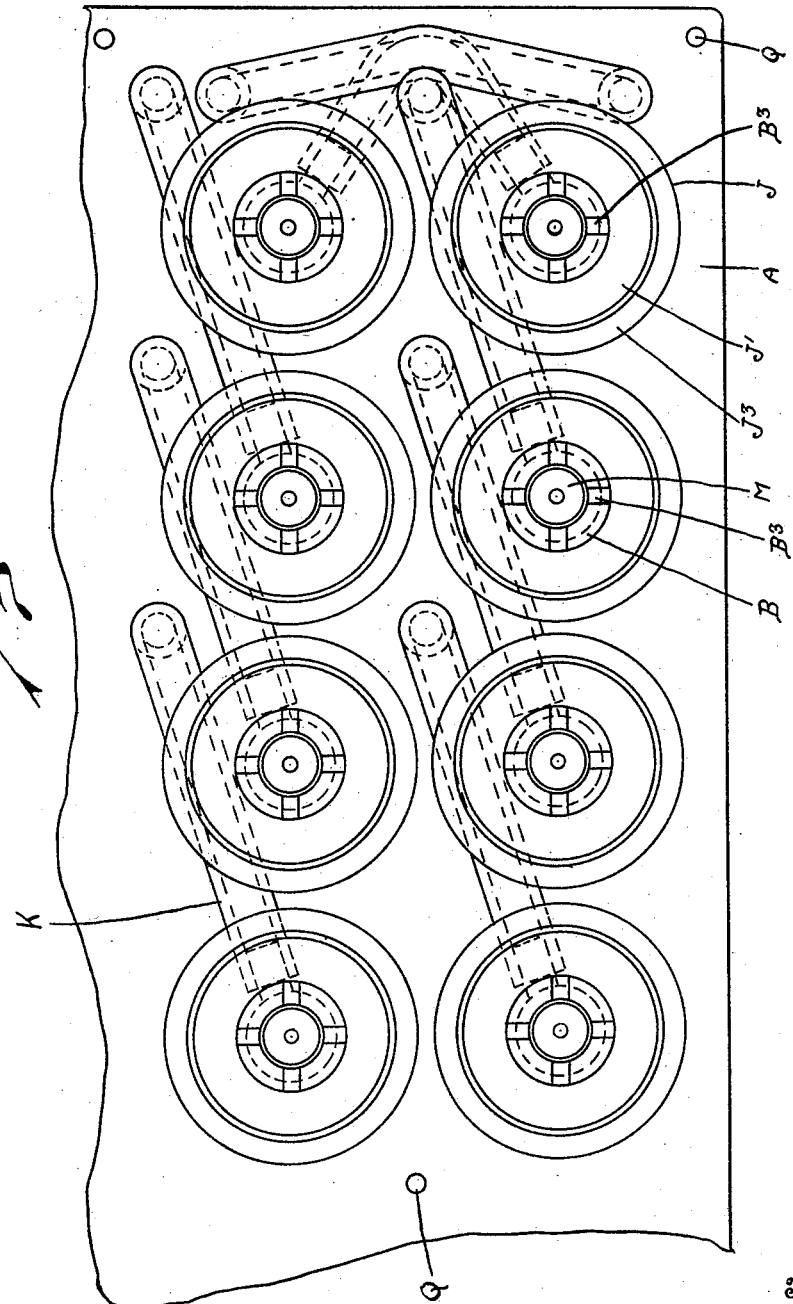

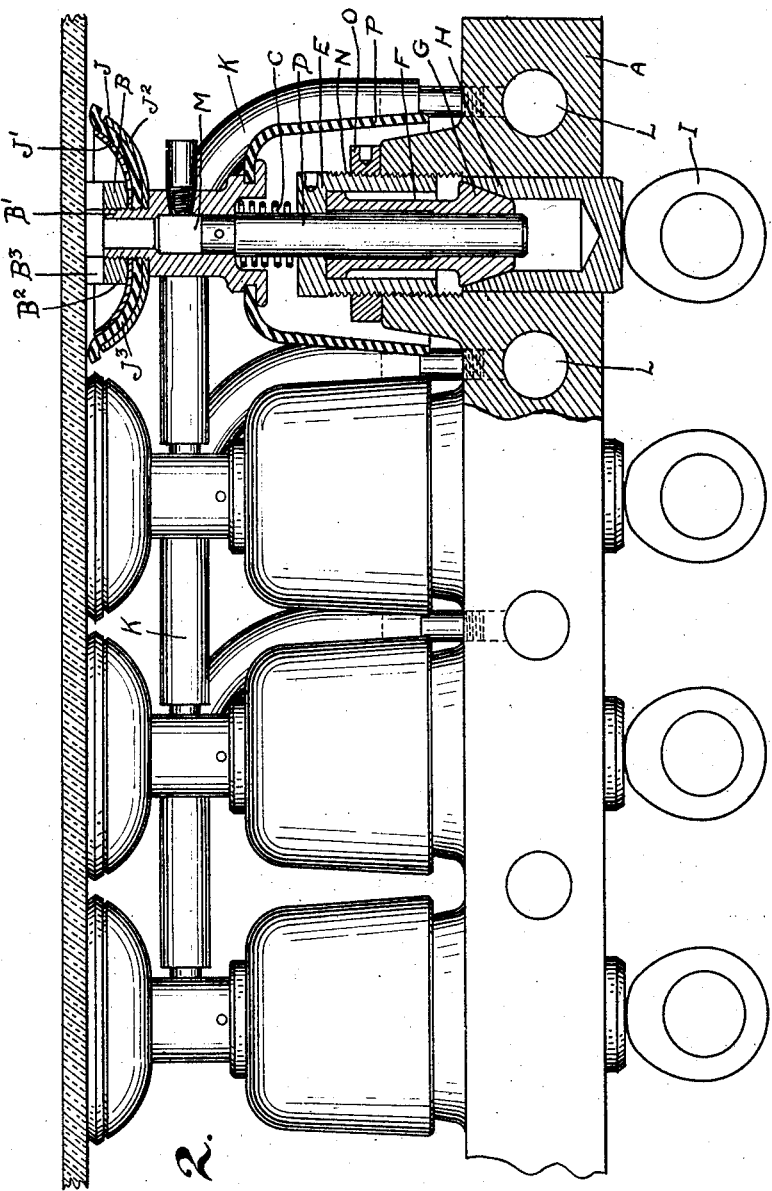

WILLIAM ALBERT HATCHER, OF DETROIT, MICHIGAN, ASSIGNOR TO CRESCENT PUMP COMPANY, OF DETROIT, MICHIGAN, A CORPORATION OF MICHIGAN.

CHUCK.

1,408,594.     Specification of Letters Patent.     Patented Mar. 7, 1922.

Application filed November 6, 1920. Serial No. 422,194.

*To all whom it may concern:*

Be it known that I, WILLIAM A. HATCHER, a citizen of the United States of America, residing at Detroit, in the county of Wayne and State of Michigan, have invented certain new and useful Improvements in Chucks, of which the following is a specification, reference being had therein to the accompanying drawings.

The invention relates to chucks designed for the quick attachment, detachment, and secure holding of work which is being subjected to mechanical operations, and more particularly the construction is designed for holding work having more or less irregular surfaces and without any stress thereon which would tend to distort or unduly strain the body. For instance, in the grinding of plate glass, it is necessary to firmly hold the plate in a fixed plane without spring of the glass, which on account of its resiliency would cause the subsequent distortion of the ground surface or the fracture of the body where over-stressed. The invention consists in the means for yieldably engaging the surface at a multiplicity of distributed points, so that the engaging means will accurately conform to the natural surface without springing or warping the same; also, associated means for securely locking the bearings after they have been conformed with the surface to provide rigid support, and means for holding the work against said support. More specifically, the invention comprises a multiplicity of conformable lockable bearings, together with suctions for holding the work against said bearings.

In the drawings:

Figure 1 is a plan view of the chuck;

Figure 2 is a sectional side elevation thereof.

A is a bed or table. B are supporting bearings distributed over the table and yieldably supported by springs C. D is a shank for each bearing slidably engaging a guide E projecting upward from the table. F is a clutch for locking the shank D in its guide E and which, as shown, comprises a split sleeve having the conical bead G engaging a corresponding conical ring H. I is a cam for pressing the conical ring H against the conical split sleeve to lock the same to the shank D, the construction being such that the shank is normally free to slide in its guide so as to permit conformity of the bearing B with the surface resting thereon and after such conformation, the operation of the cam I will lock the bearing in rigid relation to the bed. To hold the work against the bearings B, there are provided a plurality of suction cups, preferably arranged concentric with and surrounding each bearing B, as indicated at J. These cups may be of any suitable construction, but as shown are provided with the metallic inner and outer cup members J' and J$^2$ with the soft rubber cup J$^3$ clamped therebetween. The cup J$^3$ has its marginal portion projecting beyond the rigid cups and adapted to bear against the surface of the glass plate or other work slightly in advance of the contacting of said surface with the bearing B. Suction is applied to the cups J by suitable connections, such as the flexible hose connections K, which are connected at one end to channels L in the bed and at their opposite ends to channels M within the bearings B.

To place the spring C under proper tension and also to provide for adjusting the clutch, the guide members preferably have a threaded engagement with the bed, as indicated at N. O is a lock nut for holding the members E from displacement when once adjusted, and P are enclosing casings, preferably of rubber, which surround and protect the adjustable parts.

With the construction as described, in operation, the work, such for instance as a rough plate of glass, is first placed upon the bearings B and to determine the general plane of this plate, a limited number of fixed bearings Q, preferably three, are provided. The tension of the springs C is so restricted that the plate will depress all of the bearings B without any distortion and when all have conformed to the irregular surface of the plate, the cams I are operated to lock the clutches F. Suction is then applied to the cups through the channels L and connecting conduits K, with the result that the plate is drawn against each bearing in a limited area surrounding the same. The plate thus held may be subjected to the grinding operation and when the work is complete, it may be instantaneously released by venting the cups to atmosphere. After being released, there is no tendency for the plate to change its shape, as it is not distorted while clamped, so that the ground surface will remain true.

For convenience in forming and assembling the bearings and cups, the member B has a threaded upper end B' which is engaged by a threaded ring B², the latter serving to clamp the cups J, J' and J² to the member B. The ring B² also forms a direct contacting bearing with the work and is notched or cut away, as indicated at B³, for communicating the suction from the channel M to the cup.

What I claim as my invention is:

1. In a chuck, a plurality of yieldable bearings conformable to the surface of the work in contact therewith, means for rigidly locking said bearings, and means for holding the work upon said bearings.

2. In a chuck, the combination of a plurality of yieldable bearings distributed over an area for contact with and conformity to an irregular surface of the work, means for locking said bearings after they have been conformed to the surface, and suction means for holding the work against said bearing.

3. In a chuck, a plurality of yieldably supported bearings distributed over an area and conformable to an irregular surface of the work, means for locking said bearings after the conformation of the same to the work, and suction means associated with each of the bearings for clamping the work in contact therewith.

4. In a chuck, a yieldably supported bearing for contact with a surface of the work, means for locking said bearing, and a suction cup surrounding said bearing for clamping the work in contact therewith.

5. In a chuck, a plurality of yieldably supported bearings adapted to conform to an irregular surface of the work, a plurality of rigid bearings for determining the general plane of the work, means for locking said yieldable bearings when the work is in contact with said rigid bearings to render all of said bearings rigid, and suction means associated with a plurality of said bearings for holding the work in contact therewith.

6. In a chuck, the combination of a bed, a plurality of bearings distributed over said bed and movable in relation thereto, resilient means of slight tension for yieldably pressing said bearings away from said bed, a shank connected with each bearing for guiding the same in its movement, a chuck for clamping said shank in different positions of adjustment to hold said bearing rigid, and suction means for drawing the work against said bearing.

7. A chuck comprising a bed, a plurality of devices distributed over said bed, each consisting of a work supporting bearing, a shank connected thereto, a guide on said bed on which said shank is slidably secured, resilient means of slight tension surrounding said shank and yieldably pressing said bearing away from the bed, a clutch engageable with said shank for rigidly connecting the same to said bed, means for operating said clutch, and a suction cup surrounding said bearing.

In testimony whereof I affix my signature.

WILLIAM ALBERT HATCHER.